(12) United States Patent
Isowaki et al.

(10) Patent No.: US 12,469,520 B2
(45) Date of Patent: Nov. 11, 2025

(54) MAGNETIC RECORDING DEVICE AND MAGNETIC RECORDING SYSTEM

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yousuke Isowaki, Yokohama Kanagawa (JP); Kenichiro Yamada, Minato Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/982,619

(22) Filed: Dec. 16, 2024

(65) Prior Publication Data

US 2025/0239277 A1   Jul. 24, 2025

(30) Foreign Application Priority Data

Jan. 22, 2024   (JP) ................... 2024-007504

(51) Int. Cl.
*G11B 5/09*   (2006.01)
*G06F 11/10*   (2006.01)
*G11B 7/13*   (2012.01)
*G11B 27/36*   (2006.01)

(52) U.S. Cl.
CPC .................. *G11B 27/36* (2013.01)

(58) Field of Classification Search
CPC .. G06F 11/3452; G06F 3/0616; G06F 11/008; G06F 11/0727; G06F 3/0659; G11B 13/08; G11B 5/4866; G11B 5/6088; G11B 7/16; G11B 5/54; G11B 2005/0021; G11B 5/59633; G11B 5/09; G11B 20/1816; G11B 5/4806; G11B 20/1217
USPC .......................................... 360/75
See application file for complete search history.

(56) References Cited

U.S. PATENT DOCUMENTS 9,569,121 B1    2/2017  Rausch et al.
11,456,016 B1*  9/2022  Obuchi ............. G11B 20/1217
2019/0227898 A1 7/2019  Gaertner et al.

* cited by examiner

*Primary Examiner* — Nabil Z Hindi
(74) *Attorney, Agent, or Firm* — Knobbe, Martens, Olson & Bear, LLP

(57) ABSTRACT

According to one embodiment, a magnetic recording device includes a magnetic recording medium, a plurality of magnetic heads for recording information on the magnetic recording medium, and a controller for controlling the magnetic heads. Each of the magnetic heads includes a coil, a first magnetic pole for generating a magnetic field according to a recording current supplied to the coil, and a light emitting section for irradiating the magnetic recording medium with light to locally increase a temperature of the magnetic recording medium. The controller performs a first operation, in which a lifetime information related to a remaining life time of one of the magnetic heads is calculated based on a first information related to a failure probability of a magnetic head group including the magnetic heads and a second information related to a remaining time based on a history of the one of the magnetic heads.

20 Claims, 3 Drawing Sheets

MAGNETIC RECORDING DEVICE AND MAGNETIC RECORDING SYSTEM

CROSS-REFERENCE TO RELATED APPLICATIONS

This application is based upon and claims the benefit of priority from Japanese Patent Application No. 2024-007504, filed on Jan. 22, 2024; the entire contents of which are incorporated herein by reference.

FIELD

Embodiments described herein relate generally to a magnetic recording device and a magnetic recording system.

BACKGROUND

In a magnetic recording device, information is recorded on a magnetic recording medium such as an HDD (Hard Disk Drive) using a magnetic head. Stable operation is desired in magnetic recording devices.

DETAILED DESCRIPTION

Figure 1:
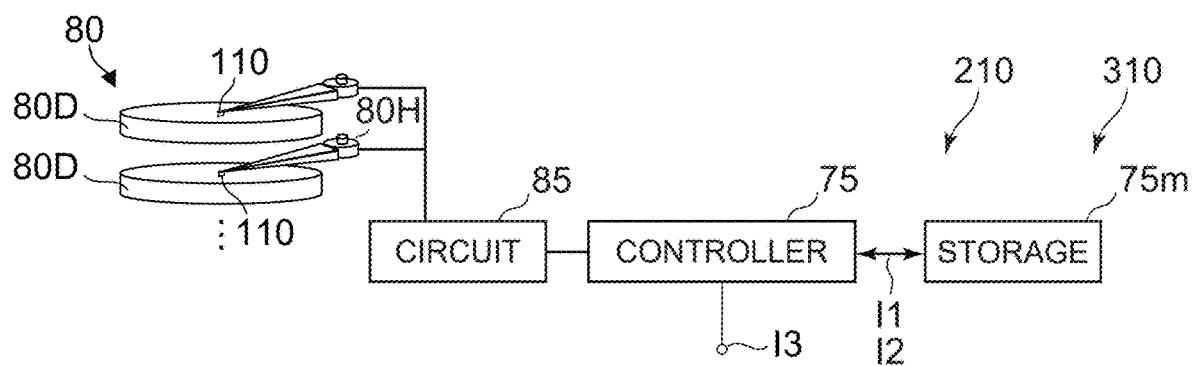
FIG. 1 is a schematic diagram illustrating a magnetic recording device according to a first embodiment.

According to one embodiment, a magnetic recording device includes a magnetic recording medium, a plurality of magnetic heads configured to record information on the magnetic recording medium, and a controller configured to control the plurality of magnetic heads. Each of the plurality of magnetic heads includes a coil, a first magnetic pole configured to generate a magnetic field according to a recording current supplied to the coil, and a light emitting section configured to irradiate the magnetic recording medium with light to locally increase a temperature of the magnetic recording medium. The controller is configured to perform a first operation. In the first operation, the controller is configured to calculate a lifetime information related to a remaining life time of one of the plurality of magnetic heads based on a first information related to a failure probability of a magnetic head group including the plurality of magnetic heads and a second information related to a remaining time based on a history of the one of the plurality of magnetic heads.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic diagram illustrating a magnetic recording device according to a first embodiment.

Figure 2:
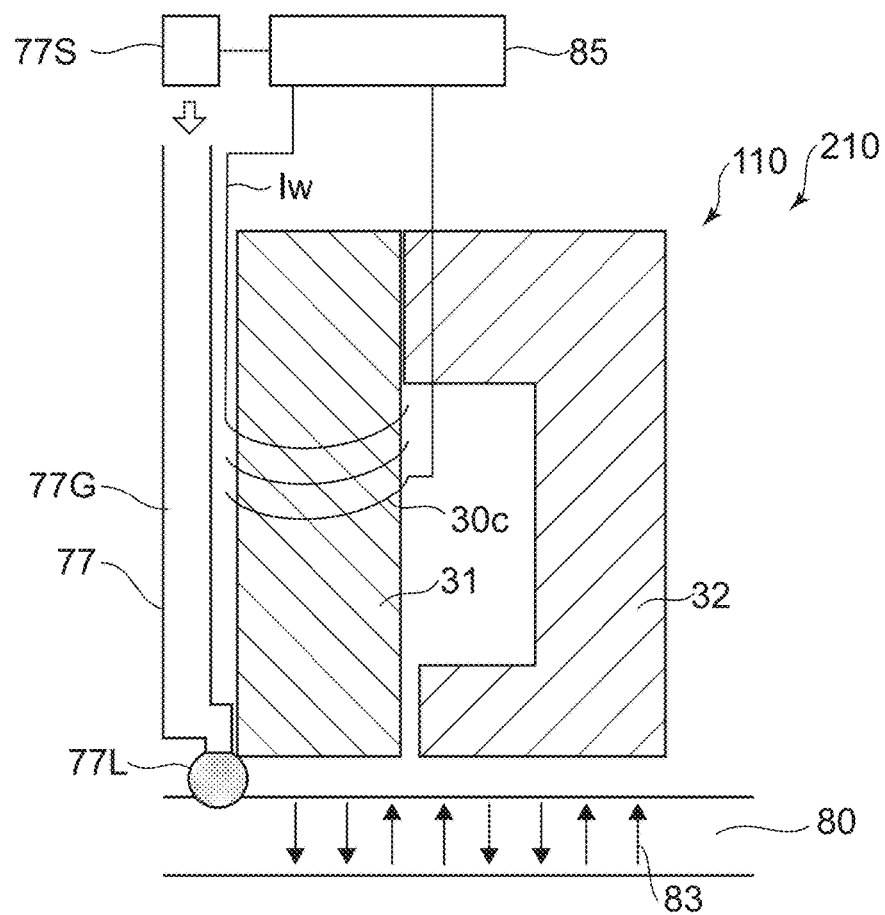
FIG. 2 is a schematic cross-sectional view illustrating a part of the magnetic recording device according to the first embodiment.

FIG. 2 is a schematic cross-sectional view illustrating a part of the magnetic recording device according to the first embodiment.

Figure 3:
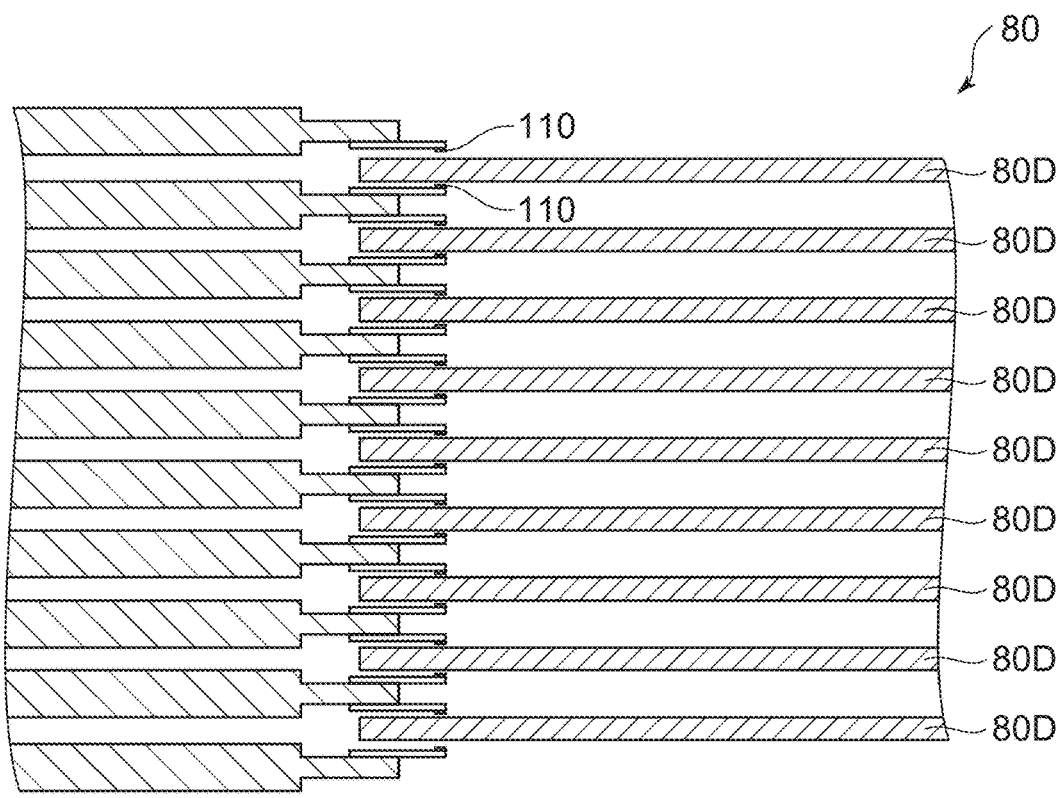
FIG. 3 is a schematic cross-sectional view illustrating a part of the magnetic recording device according to the first embodiment.

FIG. 3 is a schematic cross-sectional view illustrating a part of the magnetic recording device according to the first embodiment.

Figure 4:
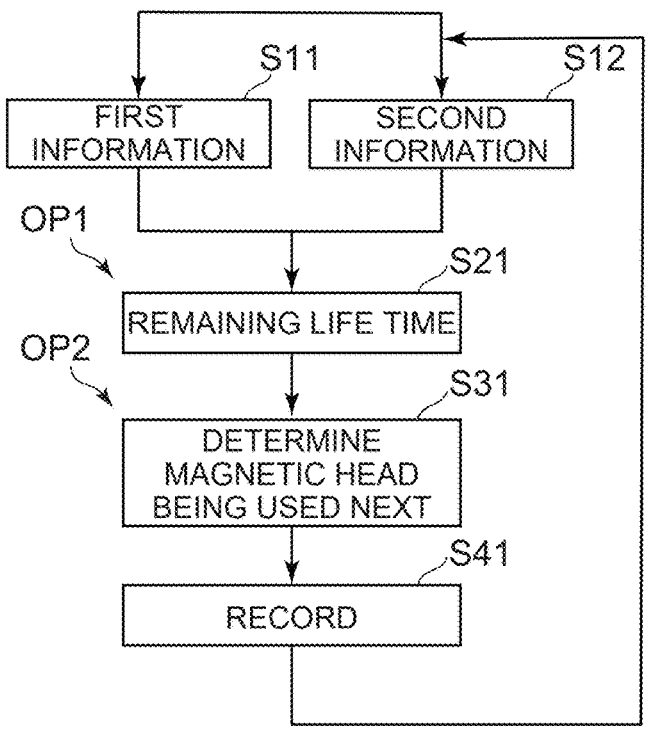
FIG. 4 is a flowchart illustrating an operation of the magnetic recording device according to the first embodiment.

FIG. 4 is a flowchart illustrating an operation of the magnetic recording device according to the first embodiment.

As shown in FIG. 1, a magnetic recording device 210 according to the embodiment includes a magnetic recording medium 80, a plurality of magnetic heads 110, and a controller 75 (for example, control circuitry). The plurality of magnetic heads 110 are configured to record information on the magnetic recording medium 80. The controller 75 is configured to control the magnetic head 110.

FIG. 2 is a schematic cross-sectional view illustrating the magnetic head 110. The magnetic head 110 includes a coil 30c and a first magnetic pole 31. The first magnetic pole 31 generates a magnetic field (recording magnetic field) according to the recording current Iw supplied to the coil 30c. The generated magnetic field is applied to the magnetic recording medium 80. Thereby, the direction of magnetization 83 of magnetic recording medium 80 is controlled. The state of magnetization 83 corresponds to the information to be recorded. In this example, the magnetic head 110 further includes a second magnetic pole 32. The first magnetic pole 31 is, for example, a main magnetic pole. The second magnetic pole 32 is, for example, a trailing shield.

The magnetic head 110 further includes a light emitting section 77. The light emitting section 77 is configured to irradiate the magnetic recording medium 80 with light 77L to locally increase the temperature of the magnetic recording medium 80. For example, HAMR (Heat Assisted Magnetic Recording) is implemented.

For example, the light emitting section 77 includes a light source 77S and a light guide 77G. The light 77L emitted from the light source 77S is guided by the light guide 77G. The light 77L emitted from the light guide 77G is emitted to the magnetic recording medium 80 via, for example, an optical element. The light source 77S is, for example, a laser.

As shown in FIG. 1, the magnetic recording medium 80 may include a plurality of magnetic disks 80D. One of the plurality of magnetic heads 110 faces one of the plurality of magnetic disks 80D.

FIG. 3 illustrates a plurality of magnetic heads 110 and a plurality of magnetic disks 80D. The plurality of magnetic heads 110 are configured to respectively record information on the plurality of magnetic disks 80D. For example, one of the plurality of magnetic heads 110 records information on one of the plurality of magnetic disks 80D. For example, another one of the plurality of magnetic heads 110 records information on another one of the plurality of magnetic disks 80D.

For example, one of the plurality of magnetic heads 110 may reproduce information recorded on one of the plurality of magnetic disks 80D. For example, another one of the plurality of magnetic heads 110 may reproduce information recorded on another one of the plurality of magnetic disks 80D. The magnetic recording device 210 may be, for example, a magnetic recording/reproducing device.

As shown in FIGS. 1 and 2, the magnetic recording device 210 may include a head control circuit 85. The head control circuit 85 supplies, for example, a recording current Iw to the coil 30c. The head control circuit 85 may control the light source 77S. The head control circuit 85 may supply power to the light source 77S.

The head control circuit 85 may process the signal reproduced by the magnetic head 110. The processing may include, for example, amplification and AD conversion.

As shown in FIG. 1, the controller 75 is connected to, for example, the head control circuit 85. The controller 75 controls the plurality of magnetic heads 110 and the magnetic recording medium 80 via, for example, the head control circuit 85.

As shown in FIG. 1, the magnetic recording device 210 may further include a storage 75m. The storage 75m is configured to store various types of information used in the operation of the controller 75.

FIG. 4 shows an example of the operation of the controller 75.

As shown in FIG. 4, the controller 75 obtains a first information I1 (step S11). The controller 75 obtains second information I2 (step S12). These information may be stored in the storage 75m, for example. These information may be supplied to the controller 75 from the storage 75m, for example.

The first information I1 relates to, for example, a failure probability of the magnetic head group. The magnetic head group includes, for example, a plurality of magnetic heads 110. For example, the magnetic recording device 210 being target includes a plurality of magnetic heads 110 being target. There is a group of products having the same configuration as that of the magnetic recording device 210 being target. The magnetic heads included in this product group correspond to the magnetic head group described above. The failure probability of the magnetic head group changes according to, for example, a bathtub curve. The first information I1 relates to a failure probability of a product group similar to the target plurality of magnetic heads 110.

On the other hand, the second information I2 relates to the remaining time based on the history of one of the plurality of magnetic heads 110. For example, the second information I2 includes at least one of a design condition, a manufacturing condition, and an inspection result regarding one of the plurality of magnetic heads 110. For example, manufacturing conditions or inspection results are different in each of the plurality of magnetic heads 110. For example, the plurality of magnetic heads 110 may have different design conditions. The characteristic unique to each of the plurality of magnetic heads 110 corresponds to the second information I2.

As shown in FIG. 4, in a first operation OP1, the controller 75 calculates the lifetime information 13 (see FIG. 1) regarding the remaining life time of one of the plurality of magnetic heads 110 based on the first information I1 and the second information I2 (step S21).

In the embodiment, for example, the lifetime information 13 regarding the remaining life time of one of the plurality of magnetic heads 110 is calculated based on the first information I1 regarding the failure probability of the magnetic head group and the second information I2 unique to the one of the plurality of magnetic heads 110. Thus, the remaining lifetime can be estimated with higher accuracy. According to the embodiment, it is possible to provide a magnetic recording device capable of obtaining a stable operation.

For example, the second information I2 is unique to the plurality of magnetic heads 110. For example, the second information I2 regarding the history of one of the plurality of magnetic heads 110 may be different from the second information I2 regarding the history of another one of the plurality of magnetic heads 110.

As shown in FIG. 4, the controller 75 may be configured to perform the first operation OP1 for each of the plurality of magnetic heads 110 and calculate the lifetime information 13 for each of the plurality of magnetic heads 110.

As shown in FIG. 4, the controller 75 may be configured to further perform a second operation OP2. In the second operation OP2, the controller 75 determines the next magnetic head 110 based on the lifetime information 13 regarding the remaining lifetime of each of the plurality of magnetic heads 110 (step S31). The next magnetic head 110 is one of the plurality of magnetic heads 110 used when recording the next information on the magnetic recording medium 80.

The remaining life time of the next one of the plurality of magnetic heads 110 is the longest among the remaining life times of each of the plurality of magnetic heads 110.

The second operation OP2 includes recording the next information on the magnetic recording medium 80 using the next one of the plurality of magnetic heads 110 (step S41). For example, by recording using the magnetic head 110 with the longest remaining life time, stable operation can be obtained for a long period of time in all of the plurality of magnetic heads 110.

As shown in FIG. 4, after step S41, the process may return to step S12 (and step S11). In the embodiment, step S11, step S12, step S21, step S31, and step S41 may be repeatedly performed.

For example, the controller 75 may be configured to repeatedly perform the first operation OP1. The second information I2 may be updated by repeating the first operation OP1. The second information I2 being updated may be stored in the storage 75m.

For example, the history of each of the plurality of magnetic heads 110 may be updated in accordance with the recording of each of the plurality of magnetic heads 110.

For example, one history of the plurality of magnetic heads 110 includes characteristics when one of the plurality of magnetic heads 110 was used for recording. The characteristics when one of the plurality of magnetic heads 110 is used for recording may include recording conditions and the like.

For example, one history of the plurality of magnetic heads 110 may include characteristics after one of the plurality of magnetic heads 110 was used for recording.

For example, one history of the plurality of magnetic heads 110 includes one state of the plurality of magnetic heads 110 after the start of use.

For example, the remaining time based on the history of one of the plurality of magnetic heads 110 may be obtained by inputting one past characteristic of the plurality of magnetic heads 110 into a first machine learning model. The first machine learning model may be, for example, a neural network model.

For example, the failure probability of the magnetic head group may be obtained by inputting the characteristics of the magnetic head group after use into a second machine learning model. The second machine learning model may be, for example, a neural network model.

For example, the failure probability of the magnetic head group may be based on a cumulative usage time. As already explained, the light emitting section 77 includes the light source 77S that emits light 77L. The failure probability of the magnetic head group may be based on the value of the power supplied to the light source 77S. The failure probability of the magnetic head group may be based on the value of the current supplied to the light source 77S.

In the embodiment, the remaining life time of one of the plurality of magnetic heads 110 may be derived based on the following first equation.

$$LT_{pos}(D_a, D_b) = (1 - P(D_a)) \times LT_{pri}(D_a, D_b) \quad (1)$$

In the first equation, $LT_{pos}(D_a, D_b)$ is the estimated remaining life time of one of the plurality of magnetic heads 110. "$D_a$" is data after the magnetic recording device 210 being target starts to be used. "$D_b$" is data before the magnetic recording device 210 being target starts to be used.

$P(D_a)$ is the failure rate of the magnetic recording device 210 being target, which is obtained based on information after the magnetic recording device 210 being target starts to be used. The information after the start of use includes, for example, the cumulative operating time of the plurality of magnetic heads 110. The information after the start of use may include, for example, the power (or current) supplied to the light source 77S. The failure rate ($P(D_a)$) can be obtained based on, for example, accelerated test data. The failure rate ($P(D_a)$) may be included in the first information I1, for example.

In the first equation, $LT_{pri}(D_a, D_b)$ is a potential life time of one of the plurality of magnetic heads 110. The potential life time is obtained based on, for example, the test result of one of the plurality of magnetic heads 110. The potential lifetime can be obtained, for example, by inputting test results and the like into a machine learning model that is obtained based on accelerated test data. The machine learning model estimates the lifetime. $LT_{pri}(D_a, D_b)$ corresponds to the remaining time based on the history of one of the plurality of magnetic heads 110, for example. $LT_{pri}(D_a, D_b)$ may be included in the second information I2, for example.

As shown in the first equation, when the failure probability of the magnetic head group is $P(D_a)$, the remaining life time ($LT_{pos}(D_a, D_b)$) of one of the plurality of magnetic heads 110 may be a product of the remaining time ($LT_{pri}(D_a, D_b)$) based on the history of one of the plurality of magnetic heads and ($1-P(D_a)$).

"$1-P(D_a)$" is a function of the failure probability of the magnetic head group. The remaining life time of one of the plurality of magnetic heads 110 may be the product of a function of the failure probability of the magnetic head group and the remaining time based on the history of one of the plurality of magnetic heads 110.

In the embodiment, the controller 75 may be configured to acquire the first information I1 and the second information I2 from the storage 75m configured to store the first information I1 and the second information I2 and perform the first operation OP1.

The controller 75 may obtain the first information I1 and the second information I2 from the storage 75m configured to store the first information I1 and the second information I2, and repeatedly performs the first operation OP1. As already explained, the second information I2 is updated by repeating the first operation OP1. The storage 75m may be configured to store the second information I2 being updated.

The storage 75m may be included in the magnetic recording device 210. The storage 75m may be provided separately from the magnetic recording device 210.

Figure 5:
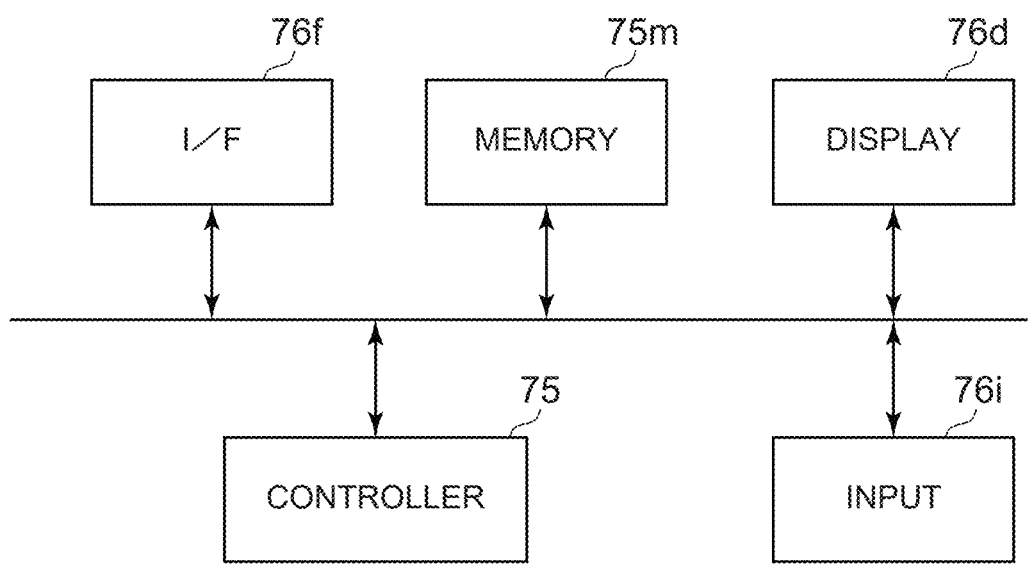
FIG. 5 is a schematic diagram illustrating a part of the magnetic recording device according to the first embodiment.

FIG. 5 is a schematic diagram illustrating a part of the magnetic recording device according to the first embodiment.

As shown in FIG. 5, the magnetic recording device 210 may include the controller 75. The magnetic recording device 210 may further include the storage 75m. The magnetic recording device 210 may include an acquisitor 76f, a display device 76d, an input device 76i, and the like. The acquisitor 76f is configured to acquire, for example, the first information I1 and the second information I2. The acquisitor 76f may supply the acquired information to the controller 75. The acquisitor 76f may output the lifetime information 13, for example. The acquisitor 76f is, for example, an interface. The controller 75 may include, for example, a processor (processing circuitry).

Second Embodiment

The second embodiment relates to a magnetic recording system 310 (see FIG. 1). The magnetic recording system 310 includes the magnetic recording device 210 according to the embodiment and the storage 75m. Information may be transmitted and received between the magnetic recording device 210 and the storage 75m by any wired or wireless method.

Embodiments may include the following technical solutions.

(Technical Proposal 1)

A magnetic recording device, comprising:
a magnetic recording medium;
a plurality of magnetic heads configured to record information on the magnetic recording medium; and
a controller configured to control the plurality of magnetic heads,
each of the plurality of magnetic heads including:
a coil,
a first magnetic pole configured to generate a magnetic field according to a recording current supplied to the coil, and
a light emitting section configured to irradiate the magnetic recording medium with light to locally increase a temperature of the magnetic recording medium,
the controller being configured to perform a first operation,
in the first operation, the controller being configured to calculate a lifetime information related to a remaining life time of one of the plurality of magnetic heads based on a first information related to a failure probability of a magnetic head group including the plurality of magnetic heads and a second information related to a remaining time based on a history of the one of the plurality of magnetic heads.

(Technical Proposal 2)

The magnetic recording device according to Technical proposal 1, wherein
the controller is configured to perform the first operation for each of the plurality of magnetic heads to calculate the life information for each of the plurality of magnetic heads.

(Technical Proposal 3)

The magnetic recording device according to Technical proposal 2, wherein
the controller is configured to further perform a second operation,
in the second operation, the controller is configured to determine a next one of the plurality of magnetic heads to be used when recording a next information on the magnetic recording medium based on the life time information related to the remaining life time of each of the plurality of magnetic heads.

(Technical Proposal 4)

The magnetic recording device according to Technical proposal 3, wherein
the remaining lifetime of the next one of the plurality of magnetic heads is the longest among the remaining lifetimes of the plurality of magnetic heads.

(Technical Proposal 5)

The magnetic recording device according to Technical proposal 3 or 4, wherein
the second operation includes recording the next information on the magnetic recording medium using the next one of the plurality of magnetic heads.

(Technical Proposal 6)

The magnetic recording device according to any one of Technical proposals 1-5, wherein
the history includes a characteristic when the one of the plurality of magnetic heads is used for recording.

(Technical Proposal 7)

The magnetic recording device according to Technical proposal 6, wherein
the history includes a characteristic after the one of the plurality of magnetic heads is used for recording.

(Technical Proposal 8)

The magnetic recording device according to any one of Technical proposals 1-7, wherein
the second information includes at least one of a design condition, a manufacturing condition, and an inspection result regarding the one of the plurality of magnetic heads.

(Technical Proposal 9)

The magnetic recording device according to any one of Technical proposals 1-8, wherein
the second information related to the history of the one of the plurality of magnetic heads is different from the second information related to the history of another one of the plurality of magnetic heads.

(Technical Proposal 10)

The magnetic recording device according to any one of Technical proposals 1-9, wherein
the remaining lifetime of the one of the plurality of magnetic heads is a product of a function of the failure probability of the magnetic head group and the remaining time based on the history of the one of the plurality of magnetic heads.

(Technical Proposal 11)

The magnetic recording device according to any one of Technical proposals 1-10, wherein
the remaining time based on the history of the one of the plurality of magnetic heads is obtained by inputting past characteristics of the one of the plurality of magnetic heads to a first machine learning model.

(Technical Proposal 12)

The magnetic recording device according to any one of Technical proposals 1-11, wherein
the history of the one of the plurality of magnetic heads includes a state of the one of the plurality of magnetic heads after start of use.

(Technical Proposal 13)

The magnetic recording device according to any one of Technical proposals 1-12, wherein
the failure probability of the magnetic head group is based on an accumulated use time.

(Technical Proposal 14)

The magnetic recording device according to any one of Technical proposals 1-13, wherein
the light emitting section includes a light source configured to emit the light, and
the failure probability of the magnetic head group is based on power supplied to the light source.

(Technical Proposal 15)

The magnetic recording device according to any one of Technical proposals 1-14, wherein
the failure probability of the magnetic head group is obtained by inputting characteristics of the magnetic head group after start of use to a second machine learning model.

(Technical Proposal 16)

The magnetic recording device according to any one of Technical proposals 1-15, wherein
the controller is configured to repeatedly perform the first operation, and the second information is updated by repeating the first operation.

(Technical Proposal 17)

The magnetic recording device according to any one of Technical proposals 1-16, wherein
the controller is configured to acquire the first information and the second information from a storage configured to store the first information and the second information to perform the first operation.

(Technical Proposal 18)

The magnetic recording device according to any one of Technical proposals 1-15, wherein
the controller is configured to obtain the first information and the second information from a storage configured to store the first information and the second information to perform the first operation,
the controller is configured to repeatedly perform the first operation,
the second information is updated by repeating the first operation, and
the storage is configured to store the second information being updated.

(Technical Proposal 19)

The magnetic recording device according to any one of Technical proposals 1-16, further comprising:
a storage configured to store at least one of the first information and the second information.

(Technical proposal 20)

A magnetic recording system, comprising:
the magnetic recording device according to Technical proposal 17 or 18; and
the storage.

According to the embodiments, it is possible to provide a magnetic recording device and a magnetic recording system that provide stable operation.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording devices and magnetic recording systems such as magnetic recording medium, magnetic heads, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording devices and all magnetic recording systems practicable by an appropriate design modification by one skilled in the art based on the magnetic recording devices and the magnetic recording systems described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording device, comprising:
    a magnetic recording medium;
    a plurality of magnetic heads configured to record information on the magnetic recording medium; and
    a controller configured to control the plurality of magnetic heads,
    each of the plurality of magnetic heads including:
    a coil,
    a first magnetic pole configured to generate a magnetic field according to a recording current supplied to the coil, and
    a light emitting section configured to irradiate the magnetic recording medium with light to locally increase a temperature of the magnetic recording medium,
    the controller being configured to perform a first operation,
    in the first operation, the controller being configured to calculate a lifetime information related to a remaining life time of one of the plurality of magnetic heads based on a first information related to a failure probability of a magnetic head group including the plurality of magnetic heads and a second information related to a remaining time based on a history of the one of the plurality of magnetic heads.

2. The device according to claim 1, wherein
    the controller is configured to perform the first operation for each of the plurality of magnetic heads to calculate the life information for each of the plurality of magnetic heads.

3. The device according to claim 2, wherein
    the controller is configured to further perform a second operation,
    in the second operation, the controller is configured to determine a next one of the plurality of magnetic heads to be used when recording a next information on the magnetic recording medium based on the life time information related to the remaining life time of each of the plurality of magnetic heads.

4. The device according to claim 3, wherein
    the remaining lifetime of the next one of the plurality of magnetic heads is the longest among the remaining lifetimes of the plurality of magnetic heads.

5. The device according to claim 3, wherein
    the second operation includes recording the next information on the magnetic recording medium using the next one of the plurality of magnetic heads.

6. The device according to claim 1, wherein
    the history includes a characteristic when the one of the plurality of magnetic heads is used for recording.

7. The device according to claim 6, wherein
    the history includes a characteristic after the one of the plurality of magnetic heads is used for recording.

8. The device according to claim 1, wherein
    the second information includes at least one of a design condition, a manufacturing condition, and an inspection result regarding the one of the plurality of magnetic heads.

9. The device according to claim 1, wherein
    the second information related to the history of the one of the plurality of magnetic heads is different from the second information related to the history of another one of the plurality of magnetic heads.

10. The device according to claim 1, wherein
    the remaining lifetime of the one of the plurality of magnetic heads is a product of a function of the failure probability of the magnetic head group and the remaining time based on the history of the one of the plurality of magnetic heads.

11. The device according to claim 1, wherein
    the remaining time based on the history of the one of the plurality of magnetic heads is obtained by inputting past characteristics of the one of the plurality of magnetic heads to a first machine learning model.

12. The device according to claim 1, wherein
    the history of the one of the plurality of magnetic heads includes a state of the one of the plurality of magnetic heads after start of use.

13. The device according to claim 1, wherein
    the failure probability of the magnetic head group is based on an accumulated use time.

14. The device according to claim 1, wherein
    the light emitting section includes a light source configured to emit the light, and
    the failure probability of the magnetic head group is based on power supplied to the light source.

15. The device according to claim 1, wherein
    the failure probability of the magnetic head group is obtained by inputting characteristics of the magnetic head group after start of use to a second machine learning model.

16. The device according to claim 1, wherein
    the controller is configured to repeatedly perform the first operation, and
    the second information is updated by repeating the first operation.

17. The device according to claim 1, wherein
    the controller is configured to acquire the first information and the second information from a storage configured to store the first information and the second information to perform the first operation.

18. The device according to claim 1, wherein
the controller is configured to obtain the first information and the second information from a storage configured to store the first information and the second information to perform the first operation,
the controller is configured to repeatedly perform the first operation,
the second information is updated by repeating the first operation, and
the storage is configured to store the second information being updated.

19. The device according to claim 1, further comprising:
a storage configured to store at least one of the first information and the second information.

20. A magnetic recording system, comprising:
the magnetic recording device according to claim 17; and
the storage.

\* \* \* \* \*